Figure 1:
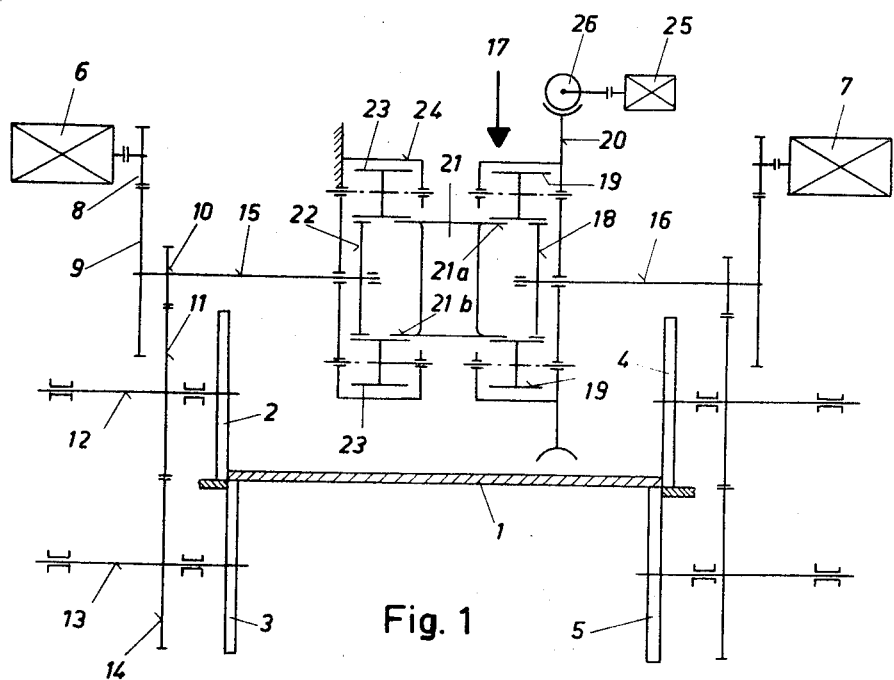

United States Patent
Fries et al.

[15] 3,662,638
[45] May 16, 1972

[54] SHEARLINE FOR TRIMMING PLATES AND SHEETS, IN PARTICULAR HEAVY PLATES, BY MEANS OF CIRCULAR CUTTER MEANS

[72] Inventors: Gunter Karl Fries, Neunkirchen (Saar); Berthold Jakob Marx, Rohrbach (caar), both of Germany

[73] Assignee: Moeller & Neumann GmbH, Ingbert(Saar), Germany

[22] Filed: Jan. 19, 1970

[21] Appl. No.: 3,651

[30] Foreign Application Priority Data

Jan. 24, 1969 Germany ..................P 19 03 488.9

[52] U.S. Cl. ..................................83/367, 83/429, 83/430, 83/494, 83/500
[51] Int. Cl. ..........................................................B23d 19/06

[58] Field of Search ..................83/429, 430, 491–493, 83/494, 360, 367, 500–504

[56] References Cited

UNITED STATES PATENTS 2,003,049  5/1935  Hull ..................................83/492 X
1,937,360  11/1933  Rosener ..............................83/492

*Primary Examiner*—James M. Meister
*Attorney*—John J. Dennemeyer

[57] ABSTRACT

In a shears line for trimming sheets or plates by means of two oppositely disposed circular cutter shears, variable gear means are provided for varying the rotary speed of the one circular cutter pair relatively to the other circular cutter pair, thereby to obtain a straight line delivery of the trimmed sheets or plates. The variable gear means may be controlled manually or automatically.

6 Claims, 2 Drawing Figures

SHEARLINE FOR TRIMMING PLATES AND SHEETS, IN PARTICULAR HEAVY PLATES, BY MEANS OF CIRCULAR CUTTER MEANS

This invention relates to a shear line for trimming plates and sheets, in particular heavy plates, by means of circular cutter shears.

Shear lines with circular cutter trimming shears have the advantage over shearlines with straight cutter trimming shears in that they can operate continuously. However, it is frequently found to be a disadvantage that the sheets or plates do not run through the circular cutter shears in a straight line, so that an arcuate shape is produced. This effect cannot always be avoided by means of guide means disposed beyond the circular cutter shears arrangement, in particular when heavy plates are to be trimmed.

The reasons for the production of the arcuate shape have been clear for a long time. These reasons are e.g. difference of hardness of the edges of the plate to be trimmed, different cutter radii or different adjustment of the cutting gaps of the two circular cutter pairs, one edge of a plate or sheet being wavier than the other edge thereof, trimmed edge strips of unequal width, and other factors.

It has been found that the arcuate shape of a trimmed plate is caused basically by the fact that the two circular cutter pairs exert mutually different conveyance effects. On the other hand the oppositely disposed circular cutter trimming shears must be rigidly coupled to each other in order to maintain a constant rotary speed thereof independently of the cutting effect demanded from each cutter pair individually. This coupling has been regarded heretofore as the best-measure that can be taken to obtain a straight delivery of the plates.

In order to avoid the production of arcuate plates when the latter are trimmed by means of circular cutter trimming shears, the invention proposes to omit the rigid unchangeable coupling between the circular cutter pairs and to provide means for imparting a lead or lag to the drive of one circular cutter pair relatively to the other circular cutter pair. In order to effect the lead or lag of a circular cutter pair, in the case of an electrically synchronized individual drive for each of the two circular cutter pairs, a variable gear is disposed in the drive of the one circular cutter pair. The term variable gear is intended to denote a kind of differential gear in which the so-called cage on which the compensating wheel or wheels is or are mounted is rotatably displaceable, whereby the take-off shaft can be given a lead or lag relatively to the drive shaft.

Since, however, an electrically synchronized individual drive of two circular cutter shears is expensive and the possibility exists that the electrical synchronization is not accurate enough, another embodiment of the invention provides a rigid driving connection between the circular cutter pairs and a variable gear which is inserted in the driving connection. The variable drive constructed according to the invention may comprise a planetary drive having two sun wheels with different numbers of teeth and planet wheels which are mounted in a rotatably adjustable cage, wherein the step-up effected by the different number of teeth of the sun wheels is reversed again by a further fixed step-down gear stage. A variable drive constructed in this manner is known per se, for example for adjusting the airscrew blades of an airplane. Since the direction of rotation is not reversed by such a drive and the drive acts like a rigid connection when the cage is held stationary and is not displaced, not only symmetrical driving connections are obtained for the two circular cutter pairs, but also a driving motor may be provided for each of the two circular cutter pairs and the two motors mechanically synchronized with each other. By adjusting the cage a rotary displacement between the two shafts incorporating the variable drive is adjustable whereby the one circular cutter pair can be set to lead or lag relatively to the other in order to avoid irregular delivery of a plate during trimming and thus an arcuate shape thereof.

It lies within the scope of the invention that the variable drive is actuated more or less frequently for a short period by means of a push-button switch after visual observation of the travel of a plate edge or after observation of an indicating instrument of an edge sensing device. Automatic straight delivery of the plate may be obtained according to a further proposal lying within the scope of the invention in that the lead and lag of a circular cutter pair is initiated by an edge sensing device for travelling webs which is disposed a short distance beyond the shears arrangement. Such web center position controls which may operate optically or photoelectrically are known per se.

Figure 2:
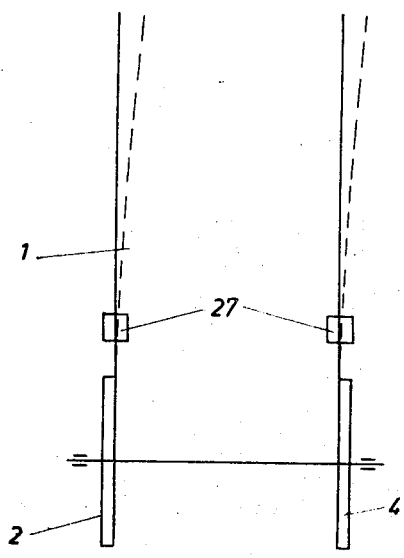

One embodiment of a shears arrangement according to the invention is described below by way of example with reference to the accompanying drawings, in which:

FIG. 1 illustrates diagrammatically two circular cutter trimming shears and a variable drive inserted in the driving connection between the two circular cutter shears, and FIG. 2 is a plan view illustrating the use of an edge sensing device beyond the trimming shear arrangement.

A shears arrangement for trimming a plate 1 consists of a circular cutter shears having circular cutters 2, 3 shown on the left hand side of FIG. 1 and of a circular cutter shears having circular cutters 4, 5 shown on the right hand side of FIG. 1. For driving the circular cutter shears there serve motors 6, 7, respectively, which actuate the shafts of the circular cutters through identical gear drives. The gear drive of the left hand shears having the circular cutters 2, 3 consists of a first gear stage 8, 9 and of a second gear stage having spur gears 10, 11. The spur gear 11 is located on a shaft 12 of the circular cutter 2 and meshes with a spur gear 14 on a shaft 13 of the circular cutter 3. The gear ratio between the spur gears 11 and 14 corresponds to the ratio of the diameters of the circular cutters 2 and 3; this ratio is equal to 1 in the present example.

From the gear drive of the left hand circular cutter shears 2, 3 and from the gear drive of the right hand circular cutter shears 4, 5 there extend connecting shafts 15, 16, respectively which are connected to each other through a variable drive which is generally denoted by 17. Thus, the variable drive 17 is engaged by the shaft 16 of the drive for the right hand circular cutter shears 4, 5, the shaft 16 carrying a sun wheel 18. Three planet wheels 19 are disposed around the periphery of this sun wheel 18 in meshing engagement therewith and are mounted in a cage 20. The planet wheels 19 are provided with teeth of such width that they are also in meshing engagement with teeth 21a of a further sun wheel 21. The sun wheel 21 is floatingly disposed between the planet wheels 19, and it is for this reason that at least three planet wheels 19 must be provided. The sun wheels 18 and 21 have diameters of the same magnitude, but they have different numbers of teeth, which necessitates compensatory tooth design of one or both wheels. The difference between the number of teeth is equal to the number of planet wheels 19, that is to say in the present example three. Thus, when the cage 20 is stationary, a rotary speed difference is produced by the gear ratio between the sun wheel 18 and the sun wheel 21.

This gear ratio must be reversed again in order that the shaft 15 has the same rotary speed as the shaft 6. In the example this is effected by a stationary drive which is disposed mirror symmetrically relatively to the variable drive 17 and which is also derived from a planetary drive having a sun wheel 22, planet wheels 23 with teeth of great width and a cage 24 which is stationary and in which the planet wheels 23 are mounted, wherein the second sun wheel having the different number of teeth is constituted by the sun wheel 21 referred to already, the sun wheel 21 having a further external toothed track 21b.

The cage 20 of the variable drive 17 proper is constructed in the form of a worm wheel and its rotary position is adjustable by means of a worm 26 actuated by a reversible motor 25. The totality of the drive disposed between the shafts 15 and 16 corresponds in principle to the known variable drives for adjusting the position of the blades of airplane airscrews; its use and arrangement in the driving connection 15, 16 between the two circular cutter trimming shears provides not only means for a sensitive relative displacement of the shaft 15 relatively to the shaft 16, in that the rotary position of the cage 20 is displaced by means of the motor 25 and the worm 26, but also a rigid coupling between the two symmetrical and identical drives for the two circular trimming shears can be reliably obtained thereby and this without change of the direction of rotation between the shafts 15 and 16.

When the plate 1 travels towards one side as illustrated by broken lines in FIG. 2 and the risk of arcuate deformation exists, the drive for the left hand circular cutter shears with the circular cutters 2, 3 can be adjusted by means of the arrangement according to FIG. 1 to lag behind the drive for the right hand cutter shears 4, 5, in order that the sheet issues in a straight line in accordance with the fully drawn lines in FIG. 2. For this purpose, the reversible adjusting motor 25 is actuated for a short period, either after visual observation or automatically in accordance with the measuring values of an edge sensing device 27 illustrated in FIG. 2, to effect a rotary adjustment of the cage 20 and thus of the planet wheels 19 in a sense which reduces the rotary speed of the sun wheel 21 relatively to that of the sun wheel 18 because of the small gear ratio between these two sun wheels.

Since a permanent change of the rotary speed between the shaft 16 and the shaft 15 must not be effected the difference of the rotary speeds caused by the different number of teeth of the sun wheels 18 and 21 is reversed again by an opposite ratio of the same magnitude between the number of teeth 21b of the sun wheel 21 and the number of teeth of the sun wheel 22. Upon displacement of the cage 20, there remains then a desired displacement of the rotary position between the shaft 16 and the shaft 15 in the sense that the shaft 15 and thus the drive for the left hand circular cutter trimming shears 2, 3 is caused to lag relatively to the drive of the right hand circular cutter trimming shears 4, 5 by an amount which depends upon the duration of actuation of the motor 25. When the plate 1 in FIg. 2 travels towards the left hand side, the drive for the left hand circular cutter trimming shears 2, 3 must be given a lead by appropriately adjusting the direction of rotation of the motor 25.

What is claimed is:
1. A shears line for trimming sheets and plates, comprising:
   two trimming shears oppositely disposed from each other, each of said shears comprising a pair of cooperating circular cutters;
   means driving said circular cutters in synchronism; and
   variable differential gear means associated with at least one pair of said circular cutters imparting rotation to said one pair of said cutters relative to the other pair of said cutters.
2. A shears line as in claim 1, wherein said means driving said circular cutters comprising separate means driving said one pair of said cutters and said other pair of said cutters, respectively, said variable differential gear means being operatively connected between said separate means driving said cutters.
3. A shears line as in claim 1, wherein said means driving said circular cutters comprises separate electrically synchronized drive means for said one pair of said cutters and said other pair of said cutters, respectively, said variable differential gear means being operatively disposed in one of said separate drive means.
4. A shears line as in claim 2, including a rigid driving connection between said pairs of cutters, said variable differential gear means being disposed in said driving connection.
5. A shears line as in claim 4, said variable differential gear means comprising a stand drive developed from a planetary drive having two sun wheels of different numbers of teeth and planet wheels, together with means mounting same in a rotatably displaceable cage, the gear ratio being effected by the different numbers of teeth of said sun wheels being reversed by a further invariable gear stage.
6. A shears line as in claim 1, including edge sensing means for traveling webs disposed a short distance beyond said shears and arranged to actuate said variable differential gear means to initiate the lead and lag of one of said pairs of circular cutters relative to the other pair.

* * * * *